United States Patent [19]
Wolf et al.

[11] Patent Number: 5,713,544
[45] Date of Patent: Feb. 3, 1998

[54] WRIST REST ASSEMBLY

[75] Inventors: Robert J. Wolf, Woodbury; Thomas J. Barnidge, Burnsville; Wayne K. Darvell, North St. Paul; Kenneth J. Kirchhoff, Gem Lake, all of Minn.

[73] Assignee: Minnesota Mining and Manufacturing Company, St. Paul, Minn.

[21] Appl. No.: 597,323

[22] Filed: Feb. 6, 1996

Related U.S. Application Data

[63] Continuation of Ser. No. 253,510, Jun. 3, 1994, abandoned.

[51] Int. Cl.⁶ ............................................. F16M 11/16
[52] U.S. Cl. ...................... 248/118; 248/918; 400/715
[58] Field of Search ........................ 248/118, 118.1, 248/118.3, 118.5, 918; 400/715

[56] References Cited

U.S. PATENT DOCUMENTS

| | | | |
|---|---|---|---|
| 793,756 | 7/1905 | Williams | 248/118.5 |
| 2,694,026 | 11/1954 | Johnson . | |
| 2,720,660 | 10/1955 | Smtih . | |
| 3,676,387 | 7/1972 | Lindlof | 260/28.5 |
| 4,481,556 | 11/1984 | Berke et al. . | |
| 4,482,063 | 11/1984 | Berke et al. . | |
| 4,482,064 | 11/1984 | Berke et al. . | |
| 4,483,634 | 11/1984 | Frey et al. . | |
| 4,545,554 | 10/1985 | Latino et al. | 248/118.1 |
| 4,592,528 | 6/1986 | Still . | |
| 4,621,781 | 11/1986 | Springer | 248/118 |
| 4,776,284 | 10/1988 | McIntosh . | |
| 4,822,103 | 4/1989 | Stenvall . | |
| 4,973,176 | 11/1990 | Dietrich . | |
| 5,131,614 | 7/1992 | Garcia et al. | 248/118 |
| 5,163,646 | 11/1992 | Engelhardt | 248/118 |
| 5,183,230 | 2/1993 | Walker et al. | 248/118 |
| 5,219,136 | 6/1993 | Hassel et al. | 248/118 |
| 5,228,655 | 7/1993 | Garcia et al. | 248/118 |
| 5,242,139 | 9/1993 | Aldrich | 248/118 |
| 5,262,468 | 11/1993 | Chen . | |
| 5,356,099 | 10/1994 | Sereboff | 248/118.1 |

FOREIGN PATENT DOCUMENTS

| | | | |
|---|---|---|---|
| 1268431 | 3/1972 | United Kingdom | 260/28.5 |

*Primary Examiner*—Derek J. Berger
*Attorney, Agent, or Firm*—William L. Huebsch; Carolyn V. Peters

[57] ABSTRACT

A wrist rest assembly for use along the front edge of a device to be operated by a person's hands or fingers, such as in front of a computer keyboard, including an elongate base on which is supported an elongate pad comprising a layer of gel within the covering. The pad has sufficient thickness between its top and bottom surfaces and width between its edges to afford supporting a users wrists on the top surface with a portion of the layer of gel beneath and conforming to the supported wrists and to afford significant motion of the top surface of the pad with the supported wrists relative to the bottom surface in a plane generally parallel to the upper surface of the base. The base has a top portion supporting the pad, a bottom portion adapted to be supported on a horizontal surface; and structure that allows the top portion to be supported on the bottom portion with the top surface of the pad at a predetermined one of several different distances above that horizontal surface.

15 Claims, 5 Drawing Sheets

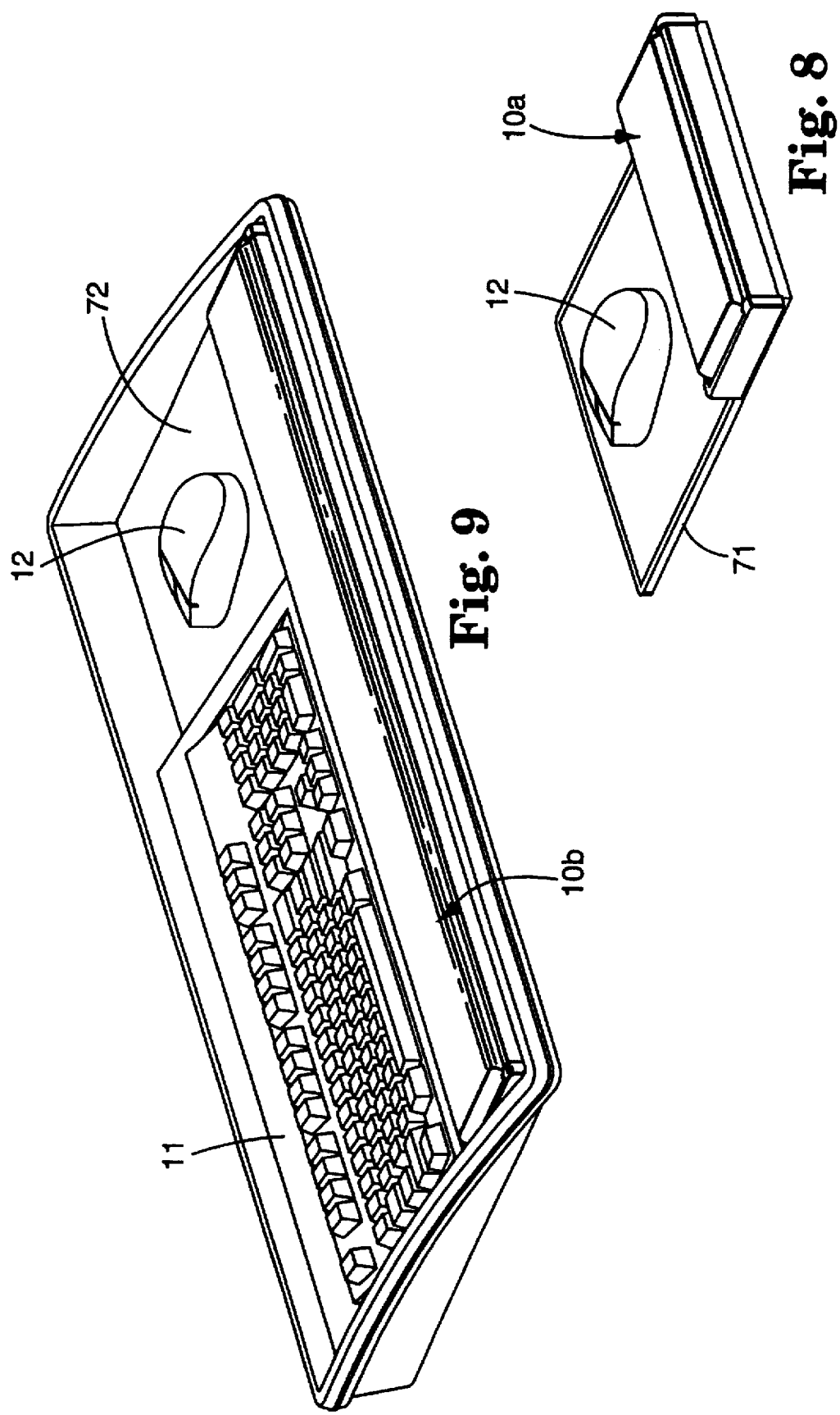

WRIST REST ASSEMBLY

This is a continuation of application Ser. No. 08/253,510 filed Jun. 3, 1994 now abandoned,

TECHNICAL FIELD

The present invention relates to wrist rest assemblies for use along the front edges of devices to be operated by a person's hands or fingers, such as in front of a computer keyboard, computer mouse or other input device.

BACKGROUND ART

Wrist rest assemblies are known for use along the front edge of a device to be operated by a person's hands or fingers, such as in front of a computer key board, computer mouse or other input device. It has been suggested that the use of such wrist rest assemblies can restrict damage to wrists from prolonged use of such devices. Heretofore, however, known wrist rest assemblies have been formed with layers of cushioning material that do not provide the quality of support for the wrists that may be desired.

DISCLOSURE OF INVENTION

The present invention provides a wrist rest assembly for use along the front edge of a device to be operated by a person's hands or fingers, such as in front of a computer key board, computer mouse or other input device, which wrist rest assembly provides a layer of cushioning material that can provide better support for the wrists than has heretofore been provided, and further affords a degree of movement of the supported wrist relative to the surface on which the wrist rest is supported that has not been provided by known prior art wrist rest assemblies.

According to the present invention there is provided a wrist rest assembly comprising (1) a base having an upper pad support Surface, which base has a bottom or supported surface adapted to be supported on a horizontal surface along the front edge of the device; and (2) a pad comprising a layer of gel. A bottom surface of the elongate pad is supported on the upper pad support surface of the base, and the pad has a sufficient width between its edges and thickness between its top and bottom surfaces (e.g., a thickness in the range of about ⅛ inch to 5 inches and a width in the range of about ½ to 10 inches with the larger widths providing both wrist and fore arm support) to afford supporting a users wrists on the top surface to help keep the wrists in a neutral position with a portion of the layer of gel beneath and conforming to the supported wrists to distribute the weight of the wrists over a wide area and affording significant motion of the top surface of the pad with the supported wrists relative to the bottom surface in a plane generally parallel to the upper surface of the base.

Preferably the gel is a stable elastomeric block polymer gel similar to the gel described in U.S. Pat. No. 3,676,387, the gels are polymer-oil combinations. The polymers are the A-B-A configurations wherein each block A is a glassy or resinous non-elastomeric thermosplastic polymer block with a glass transition temperature above room temperature, i.e., 25° C., having an average molecular weight of between about 2,000 and 100,000 and which is relatively incompatible with the elastomeric polymer block B. B is an elastomeric polymer block of a conjugated diene, the average molecular weight between about 15,000 and about 1,000,000 (preferably 15,000 to 250,000) and having a glass transition temperature considerably between that of blocks A. This difference in glass transition temperature may be as small as 15° C., but it is preferably at least 100° C. and more preferably at least about 125° C. The end blocks A of the block copolymer should constitute approximately 10 to 50 percent of the total polymer weight. Such block polymers and a method for their formation, are described in U.S. Pat. No. 3,265,765 (Holden et al.) issued Aug. 9, 1966, and in, general, these are quite suitable in the practice of the present invention.

Elastomeric block copolymers of the type useful in the practice of this invention have been combined with oils to make oil extended rubbers and adhesives. In the formation of adhesives, the amount of oil is generally greater than in oil extended rubbers. The formation of adhesive compositions containing such block polymer tackifying resin and oil is described in U.S. Pat. No. 3,239,478 (Harlan, Jr.) issued Mar. 8, 1966. However, in none of the rubbers or adhesives just described does the amount of oil (compatible plasticizing oil) used constitute ordinarily even as much as 67 percent of the total composition, in as much as extension beyond this point will result in an adhesive with little or no cohesive strength. Further the oils recommended in Harlan are at least partially aromatic and such aromaticity results in a soft flowable material where large percentages of oil are used for the plasticizing effect. The use of a compatible oil is nonacceptable for purposes of the non-acceptable invention.

When an elastomeric block copolymer of the kind noted herein is combined with a non-aromatic paraffinic oil of low volatility with a flash point about 350° F. and below about 500° F., wherein the oil constitutes at least about 70 percent of the total weight of the block polymer-oil elastoplastic mixture, that an extremely highly elastic material is obtained which is not only useful as such but which is capable of being melted upon heating for casting in the formation of molded or other articles at room temperatures. Stable elastoplastic materials can be formed where the oil constitutes as much as 95 percent of the combined weight of the oil and elastomeric block copolymer. When the amount of the oil is less than about 70 percent the melt viscosity becomes excessive for convenient casting from a hot melt system. When the amount of the oil is greater than about 95 percent, a thixotropic liquid results.

Paraffinic oils, which are normally considered incompatible with block polymers or other rubbers, and thus, not considered extender oils, are somewhat compatible with block copolymers at elevated temperatures (i.e. about 300° F.) to the extent that the oil and the block copolymer form a mixture which when cooled, exhibits a novel structure which is neither gel nor extended polymer, but is rather a continuous web of one-dimensional polymer strands intermingled with a continuous phase of non-compatible oil. Microscopic examination of the oil polymer mixture reveals a sponge-like construction having voids therein filled with oil. The oil may be removed by mechanical means such as pressing, filtering, etc.

The oil used must be incompatible (non-solvent) with the non-elastomeric, thermoplastic polymer block A, should be of low volatility and should have a boiling point in excess of the melting temperature of the polymer-oil combination. For thus purpose, ordinary paraffin-based petroleum oils such as mineral oil, petrolatum and other paraffin liquid petroleum products within the viscosity range of products commonly called oils are suitable in the practice of this invention. Unsuitable for purposes of the present invention are aromatic, naphthenic and cyclic containing oils.

Preferably, is the gel described in Example No. 2 of British Patent No. GB 1,268,431 (which states "A mixture of 5 parts "Nujol" (Registered Trade Mark) brand U.S.P. mineral oil and one part styrene-isoprene-styrene block copolymer ("Kraton 107") was heated to approximately 149 degrees C. and agitated vigorously until the polymer appeared visually dissolved. Empty pint bottles were dipped into this hot sol so that a layer approximately 1.59 mm thick was deposited on the bottom rim. These bottles could be filled with water and dropped repeatedly onto concrete floor or steel plates without breakage.") except that the ratio of oil to block copolymer is in the range of 4 to 1 to 10 to 1 rather than being 5 to 1 as is described in that Example No. 2. That gel is quite similar to the gel in the pad commercially available from Minnesota Mining and Manufacturing company, St. Paul, Minn., under the trade designation "RESTON (T.M.) Flotation Pad", which pad for many years has been used in beds, wheel chairs and the like to prevent pressure points. Also, preferably the gel has a covering comprising an elongate tubular layer of flexible polymeric material (e.g., polyurethane) around the gel, which tubular layer has sealed ends to retain the gel and provides a flexible barrier to the escape of mineral oil from within the gel. The pad assembly can further include an outer layer over the top surface of the pad of a soft conformable material adapted for comfortable contact with a users wrists.

Preferably the base comprises a top portion having the upper pad support surface supporting the bottom surface of the elongate pad; a bottom portion having the bottom supported surface adapted to be supported on a horizontal surface; and means for supporting the top portion on the bottom portion with the elongate pad at a predetermined one of several different distances above the supported surface. That means is provided by the top portion of the base comprising longitudinally extending rails projecting outwardly in opposite directions generally parallel to its upper pad support surface, and the bottom portion including generally parallel spaced vertically upwardly projecting support portions having opposed surfaces defining sets of grooves parallel to the supported surface and vertically spaced along the support portions, each of which sets of grooves is adapted to receive the rails to support the top portion with the top surface of the elongate pad at a different distance above the supported surface depending on which set of grooves the rails are engaged in.

While there might be advantages for some applications in allowing the top portion to reciprocate along the grooves of the bottom portion, thereby affording large transverse movements of the wrists with the top portion without relocating the wrists along the top surface of the pad; as illustrated the assembly includes means for releasably fixing the top portion relative to the bottom portions with corresponding ends of the top and bottom portions generally in alignment.

While the wrist rest assembly including its base is very useful, the base is not a necessity to using the pad. Thus generally the method according to the present invention for supporting the wrists of a person operating a device such as a computer keyboard, computer mouse or other input device comprises: (1) providing a pad comprising a layer of gel, which pad has opposite top and bottom surfaces, and opposite longitudinally extending edges; (2) supporting the pad along the front edge of the device; and (3) supporting the users wrists along the top surface of pad; the pad having a sufficient thickness between the top and bottom surfaces and width between the edges to have a portion of the layer of gel beneath and conforming to the supported wrists and to afford significant motion of the top surface of the pad with the supported wrists relative to the bottom surface in a horizontal plane.

BRIEF DESCRIPTION OF THE DRAWING

The present invention will be further described with reference to the accompanying drawing wherein like reference numerals refer to like parts in the several views, and where:

FIGS. 7, 8 and 9 illustrate uses of the wrist rest assembly of FIG. 1 or a shortened or lengthened version thereof.

DETAILED DESCRIPTION OF THE PREFERRED EMBODIMENT

Figure 5:
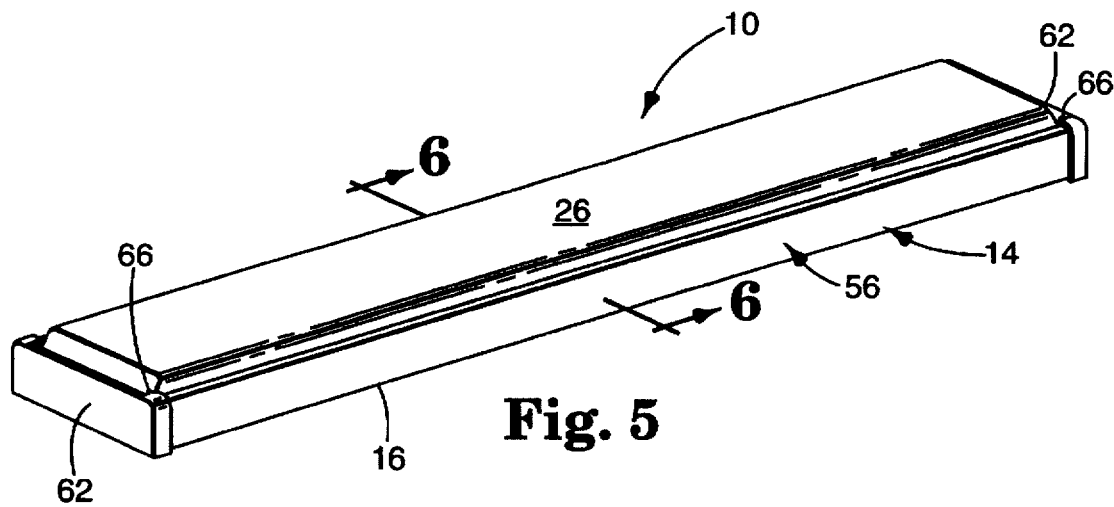
Figure 7:
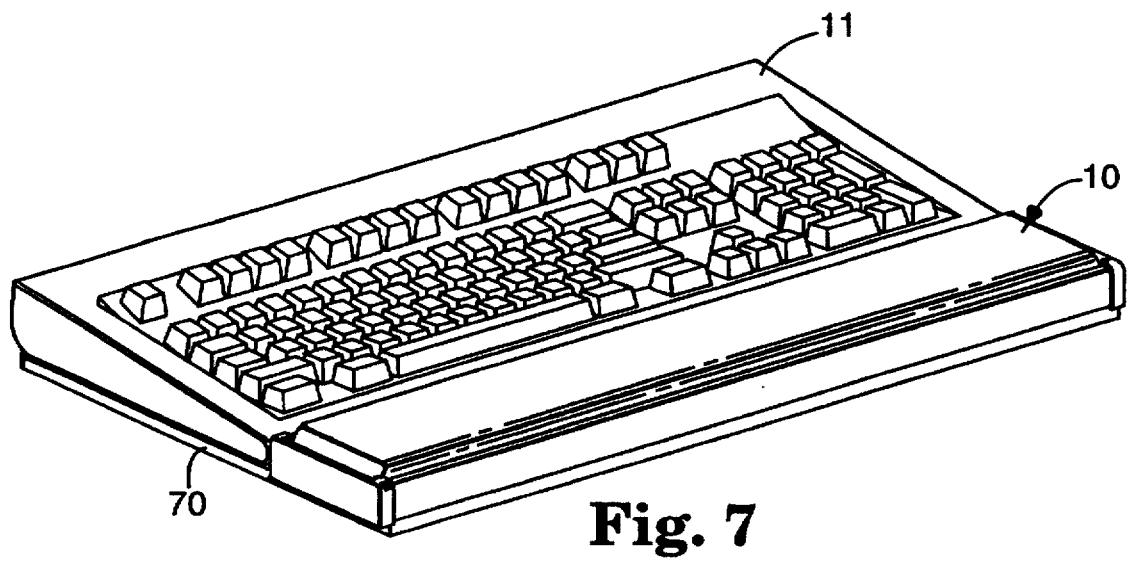

Referring now to FIG. 5 of the drawing there is illustrated a wrist rest assembly according to the present invention, generally designated by the reference numeral 10. The wrist rest assembly 10 is adapted for use along the front edge of a device to be operated by a person's hands or fingers, such as in front of a computer keyboard 11 as is illustrated in FIG. 7 or in front of a computer mouse 12 as is illustrated in FIG. 8 with a shortened version 10a thereof, or in front of a computer keyboard 11 and mouse 12 as is illustrated in FIG. 9 with an extended version 10b thereof, to provide support for the wrists of a person using the keyboard 11 and/or mouse 12.

Generally, the wrist rest assembly 10 comprises (1) an elongate base 14 having an elongate upper pad support surface 15 (see FIG. 6), which base 14 has a bottom supported surface 16 generally parallel to its upper pad support surface 15 adapted to be supported on a horizontal surface along the front edge of the device 11 or 12; and (2) an elongate pad 17 comprising a covering 18 and a layer of gel 19 within the covering 18. The pad 17, which is shown separated from the base 14 in FIG. 1, has opposite top and bottom surfaces 20 and 21, opposite longitudinally extending edges 22, and opposite ends 24. The bottom surface 21 of the elongate pad 17 is supported on and can be adhered to the upper pad support surface 15 of the base 14, and the pad 17 has a sufficient thickness between its top and bottom surfaces 20 and 21 and sufficient width between its edges 22 to afford supporting a users wrists along its top surface 20 with a portion of the layer of gel 19 beneath and conforming to the supported wrists and affording significant motion of the top surface 20 of the pad with the supported wrists relative to its bottom surface 21 in a plane generally parallel to the upper surface 15 of the base 14. As an example, when the gel 19 is that gel described in Example No. 3 in British Patent No. GB 1,268,431 except that the ratio of oil to block copolymer is 6 to 1 rather than being 5 to 1 as is described in that Example No. 3; the layer of that gel 19 has a thickness of about ⅜ inch and a width between the edges of the pad 17 of about 2.9 inches; and the covering 18 is of 0.002 inch thick polyurethane; that motion of the top surface 20 of the pad with a supported wrist relative to its bottom surface 21 in a plane generally parallel to the supported surface 16 of the base 14 allows the supported wrist and the users hand to move in any direction in a generally circular area having a diameter of about one inch. The area of such movement could be made larger or smaller by using different gel compositions, but for most embodiments of the wrist rest should be a circular area having a diameter of at least ½ inch.

FIGS. 1 through 4 sequentially illustrate the assembly of the wrist rest assembly 10 and certain details about its structure.

Figure 1:
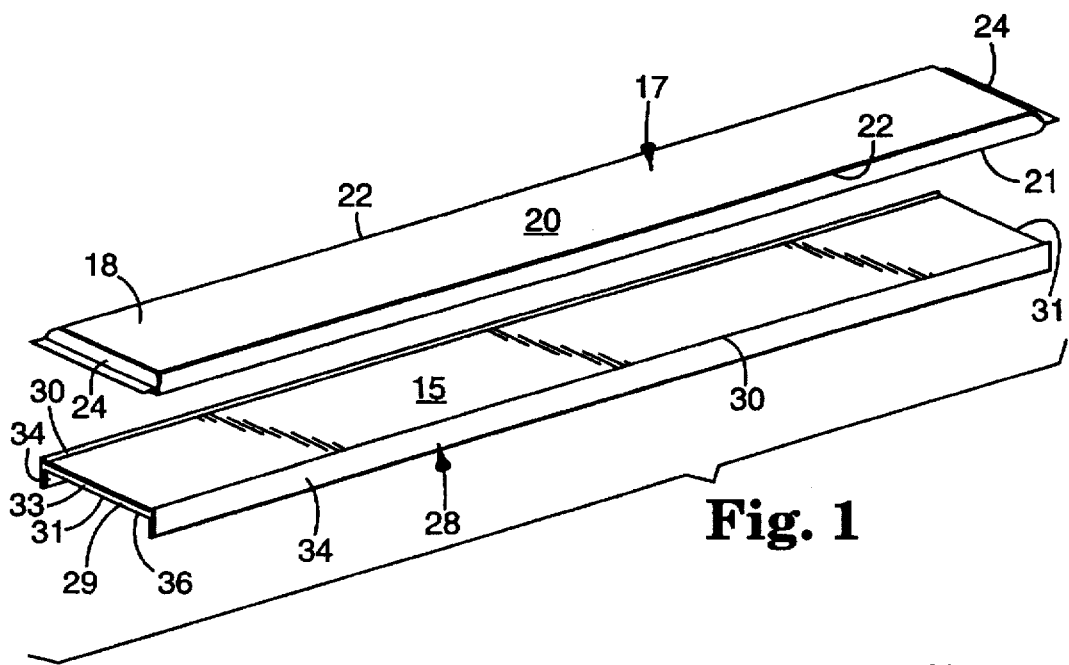
FIGS. 1 through 5 are perspective views sequentially illustrating the assembly of a wrist rest assembly according to the present invention.
Figure 2:
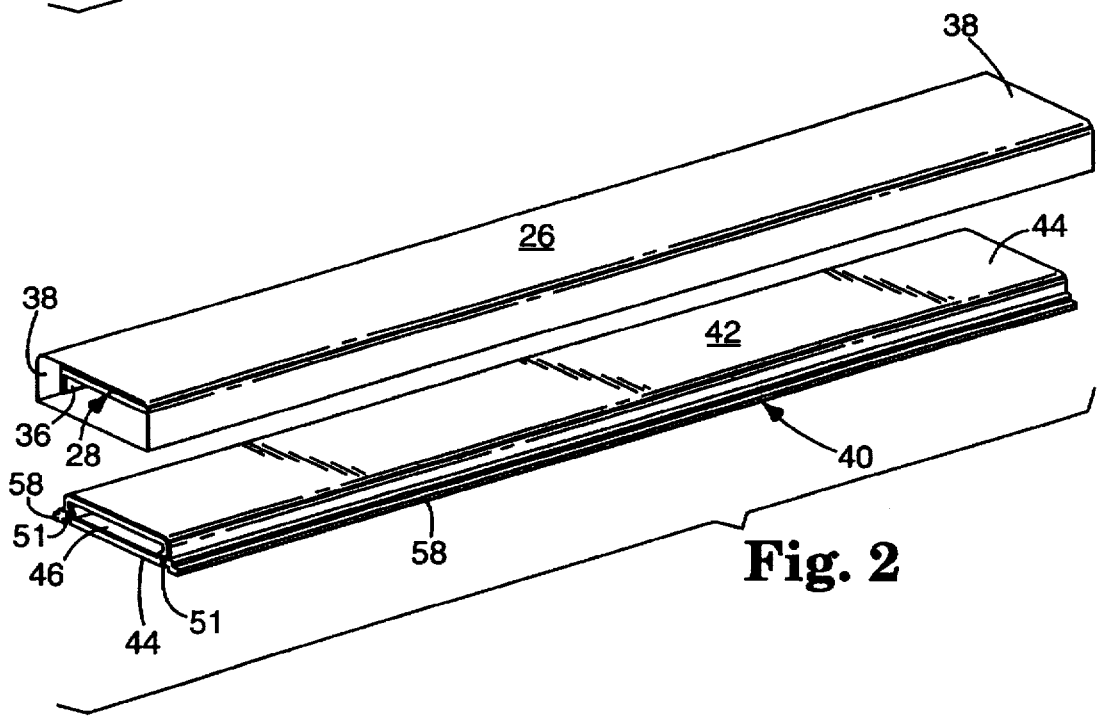

The covering 18 of the pad 17, best seen in FIG. 1, is an elongate tubular layer of a flexible polymeric material (e.g., 0.001 to 0.003 inch thick polyurethane) around the gel 19 which is sealed at the ends 24 of the pad 17 (e.g., by heat sealing) to retain the gel 19 within the tubular layer and provide a flexible barrier to the escape of mineral oil or other liquids from within the gel 19.

As is illustrated in FIGS. 2 through 6, the assembly 10 further includes an outer layer 26 over the top surface 20 of the pad 17 adapted for comfortable contact with a users wrists. That outer layer 26 can, for example, be made of a soft conformable non-woven polyurethane material, or of other materials such as leather, vinyl, or the material commercially designated "Dacron" (T.M.) sold by DuPont, Wilmington, Del., or the material commercially designated "Ultrilure" (R.T.M.).

Figure 6:
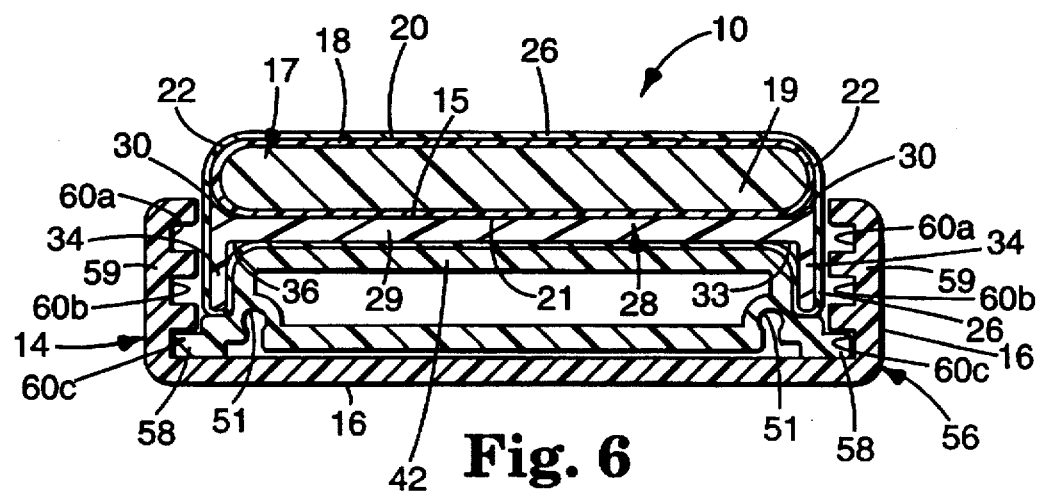
FIG. 6 is an enlarged sectional view taken approximately along lines 6—6 of FIG. 5.

The wrist rest assembly 10 tensions the outer layer 26 over the top surface 20 of the pad 17. As is best seen in FIGS. 1 and 6, the base 14 includes an elongate support plate 28 (e.g., an extrusion of rigid polyvinyl chloride or polystyrene) including a generally plate-like top portion 29 having opposite sides 30, opposite ends 31, the generally planer upper pad support surface 15, and an opposite bottom surface 33. The support plate 28 also includes plate like side portions 34 along the opposite sides of the top portion 29 and extending away from the bottom surface 33 of the top portion 29 to form with the top portion 29 an elongate recess 36. The pad 17 is supported along the upper pad support surface 15 of the support plate 28; and the outer layer 26 is in the form of an elongate sleeve having opposite end portions 38 and extends around the elongate support plate 28 and the elongate pad 17 (see FIG. 2) with its end portions 38 extending past their ends. The base 14 further includes an elongate retaining member 40 (e.g., also an extrusion of rigid polyvinyl chloride or polystyrene) comprising a tensioning portion 42 within and extending along the elongate recess 36 with a portion of the outer layer 26 between the tensioning portion 42 and the support plate 28 (see FIG. 6) to tension the outer layer 26 across the top surface 20 of the pad 17. Means (not shown) in the form of a layer of adhesive impregnating and on both sides of the outer layer 26, or ultrasonic welding, or screws, or rivets, or pins, or a friction fit between the tensioning portion 42 and the support plate 28 are provided for retaining the tensioning portion 42 within the elongate recess 36.

Figure 3:
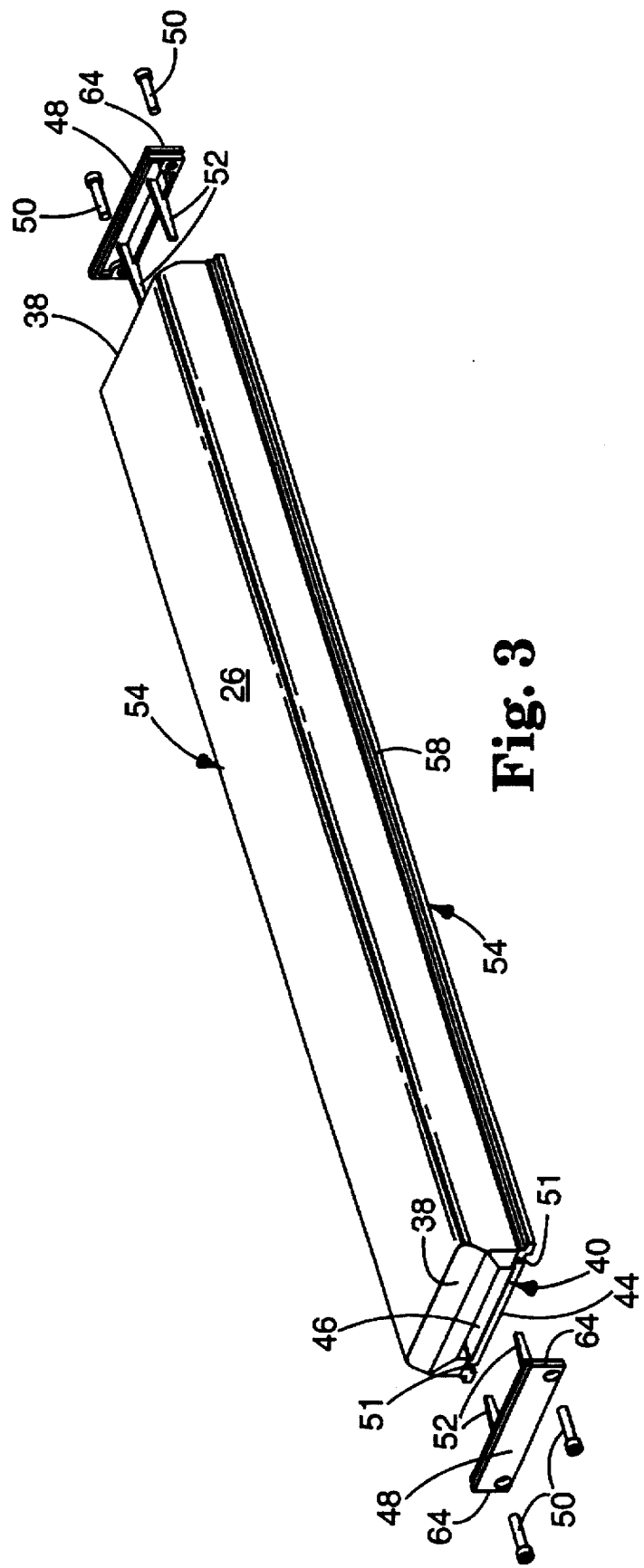

Means are also provided for retaining the end portions 38 of the sleeve or outer layer 26 around the ends 24 of the pad 17 (see FIG. 3). The retaining member 40 has opposite ends 44 at the ends 24 of the pad 17 and openings 46 into those ends 44. The end portions 38 of the sleeve of outer layer 26 that extend beyond the ends 24 of the pad 17 are positioned in the openings 46. The assembly 10 includes end caps 48 attached at the opposite ends 44 of the retaining member 40 by two self taping screws 50 extending through the end caps 48 and engaging openings 51 in the retaining member 40. The end caps 48 include projections 52 projecting into the openings 46 in the retaining member 40 that engage the end portions 38 of the outer layer 26 sleeve to provide the means for retaining those end portions 38 around the ends 24 of the pad 17.

Figure 4:
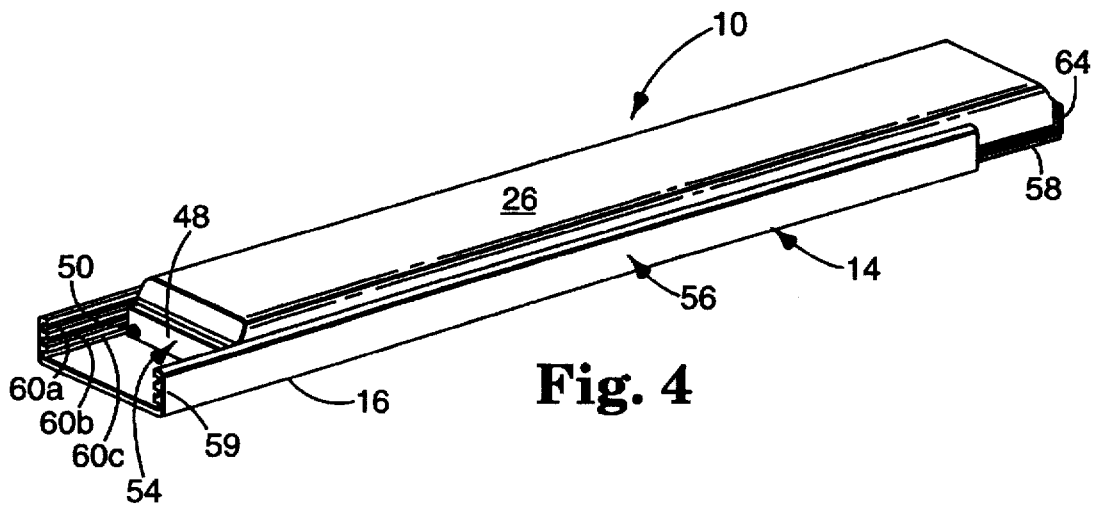

The support plate 28 and the retaining member 40 together provide a top portion 54 for the base 14 that has the upper pad support surface 15 supporting the bottom surface 21 of the elongate pad 17. The base 14 also includes a bottom portion 56 having the bottom supported surface 16 adapted to be supported on a horizontal surface; and, as is best seen in FIG. 4 and 6, means are provided for supporting the top portion 54 on the bottom portion 56 with the top surface 20 of the elongate pad 17 at a desired predetermined one of several different distances above the bottom surface 16. Those means are provided in that the top portion 54 of the base 14 comprises longitudinally extending rails 58 on the retaining member 40 projecting outwardly in opposite directions generally parallel to its upper surface 15; and the bottom portion 56 of the base 14 includes generally parallel spaced vertically upwardly projecting support portions 59 having opposed surfaces defining sets of horizontal grooves 60a, 60b and 60c vertically spaced along the support portions 59. Each of the sets of grooves 60a, 60b or 60c is adapted to slidably receive the rails 58 to support the top surface 20 of the pad 17 on the top portion 54 at a different distance above the bottom supported surface 16. Thus, the top portion 54 of the base 14 can be slid longitudinally of its bottom portion 56 to disengage the rails 58 from one set of the grooves 60a, 60b or 60c with which they are engaged, and subsequently engaged with a different set of the grooves 60a, 60b or 60c to change the distance between the supported surface 16 and the top surface 20 of the pad as may be desirable to properly support a users wrists.

As can be portions FIG. 5, the top and bottom portions 54 and 56 are both of about the same length, and the assembly 10 further includes means for releasably retaining the top portion 54 in the bottom portion 56 with the corresponding ends of the top and bottom portions 54 and 56 generally in alignment. That means comprises removable end covers 62 each adapted for engagement with an end of the top portion 54 and extending across and around the adjacent end of the bottom portion 56 so that the end of the top portion 54 with which the end cover 62 is engaged can not move further into the bottom portion 56. Engagement between each end cover 62 and an end of the top portion 54 is provided in that the end caps 48 have opposite outwardly projecting vertically extending tabs 64 (FIG. 3) at their ends adjacent the support portions 59, and the end covers 62 have opposed inwardly projecting vertically extending tabs 66 (FIG. 5) adapted to engage between the tabs 64 on the end caps 48 and the ends 44 of the retaining member 40 when the end cover 62 is slid vertically toward the supported surface 16 to the position illustrated in FIG. 5. With both end covers 62 engaged with the ends of the top and bottom portion 54 and 56 the top portion 54 cannot move in the bottom portion 56 in either direction, and thus is releasably retained in the bottom portion 56 with the corresponding ends of the top and bottom portions 54 and 56 generally in alignment.

With either or both of the end covers 62 removed, the top portion 54 can reciprocate along the bottom portion 56 by sliding movement of the rails 58 in the surfaces defining the grooves 60a, 60b or 60c with which they are engaged which affords removing the top portion 54 from the bottom portion 56 and re-engaging it with the rails 58 in a different set of grooves 60a, 60b or 60c to change the distance between the top surface 20 of the pad and the supported surface 16. Such reciprocation afforded by removing one or both of the end covers 62 might also provide advantages for some uses of the assembly 10 to affording large transverse movements of the wrists with the top portion 54 without relocating the wrists along the top surface 20 of the pad 17 (e.g., to move one hand from the typing keys to the numerical pad of a computer keyboard without lifting the wrists from the pad 17).

The present invention has now been described with reference to one embodiment thereof. It will be apparent to those skilled in the art that many changes can be made in the embodiment described without departing from the scope of the present invention. For example: the wrist rest assembly can be made any length; the pad support surface of the base could have shapes other than generally planar such as being arcuate around a longitudinal axis to make it, for example, cylindrically convex or concave, or could have transverse recesses below where a users wrists would normally be supported; the bottom portion 56 of the base could have more or less than three sets of grooves to provide larger or smaller ranges of adjustment; and the wrist rest assembly could further include a base plate attached along and having a portion projecting from the supported surface 16 of base, which projecting portion is adapted to support the device, such as those base plates 70, 71 or 72 illustrated in FIGS. 7, 8 and 9. Thus, the scope of the present invention should not be limited to the structure described in this application, but only by the structure described by the language of the claims and the equivalents thereof.

We claim:

1. A wrist rest assembly for use along the front edge of an input device to be operated by a person's hands or fingers, said wrist rest assembly comprising:

a base having an upper surface and an opposite bottom surface adapted to be supported on a horizontal surface along the front edge of the device; and a pad comprising a layer of stable elastomeric block polymer gel, said pad having opposite top and bottom surfaces, opposite longitudinally extending edges, and opposite longitudinally spaced ends, the bottom surface of said pad being supported on the upper surface of said base, said pad having the physical properties of flexibility and compressibility in the range of flexibilities and compressibilies of stable elastomeric block polymer gels made by mixing from 4 to 10 parts of U.S.P. mineral oil with one part styrene-isoprene-styrene block copolymer and heating that mixture to approximately 149 degrees C while agitating vigorously until the polymer appears visually dissolved, and a sufficient thickness between said top and bottom surfaces and width between said edges to afford supporting a users wrists on said top surface with a portion of the layer of gel beneath and conforming to the supported wrists and to afford significant motion of the top surface of the pad with the supported wrists relative to the bottom surface of the pad in a horizontal plane.

2. A wrist rest assembly according to claim 1 wherein said pad comprises an elongate tubular layer of flexible polymeric material around the gel, said tubular layer being sealed at said ends of said pad to retain the gel within the tubular layer and to provide a flexible barrier to the escape of liquids from within the gel.

3. A wrist rest assembly according to claim 1 wherein said assembly further includes an outer layer over the top surface of the pad of soft conformable material adapted for comfortable contact with a users wrists.

4. A wrist rest assembly according to claim 1 wherein said pad comprises an elongate tubular layer of flexible polymeric material around the gel, said tubular layer being sealed at said ends of said pad to retain the gel within the tubular layer and to provide a flexible barrier to the escape of liquids from within the gel; and said assembly further includes an outer layer over the top surface of the pad of soft conformable material adapted for comfortable contact with a users wrists.

5. A wrist rest assembly according to claim 1 wherein said base comprises a top portion having said upper surface supporting the bottom surface of said pad; a bottom portion having said bottom surface adapted to be supported on a horizontal surface; and means for supporting said top portion on said bottom portion with the top surface of said pad at a predetermined one of several different distances above said bottom surface of said base.

6. A wrist rest assembly according to claim 1 wherein said pad is in the range of about ⅛ inch to 5 inches thick between said top and bottom surfaces and said top surface is in the range of about ½ inch to 10 inches wide between said edges.

7. A wrist rest assembly according to claim 1 wherein the motion of said top surface of said pad with a supported wrist relative to said bottom surface of said pad in a plane generally parallel to the supported surface of the base allows that wrist to move in any direction in a generally circular area having a diameter of at least one half inch.

8. A wrist rest assembly according to claim 1 wherein the motion of said top surface of said pad with a supported wrist relative to said bottom surface of said pad in a plane generally parallel to the supported surface of the base allows that wrist to move in any direction in a generally circular area having a diameter of about one inch.

9. A wrist rest assembly according to claim 1 further including a base plate attached along and having a portion projecting from the surface of said base, said projecting portion of said base plate being adapted to support the device.

10. A wrist rest assembly for use along the front edge of an input device to be operated by a person's hands or fingers, said wrist rest assembly comprising:

a base having an upper surface and an opposite bottom surface adapted to be supported on a horizontal surface along the front edge of the device; wherein said base includes an elongate support plate including a generally planar top portion having opposite sides, opposite ends, a generally planar top surface and an opposite bottom surface, and side portions along the opposite sides of said top portion and extending away from the bottom surface of said top portion to form with said top portion an elongate recess; and a pad comprising a layer of gel, said pad having opposite top and bottom surfaces, opposite longitudinally extending edges, and opposite longitudinally spaced ends, said bottom surface of said pad is supported along the top surface of said support plate; said pad having a sufficient thickness between said top and bottom surfaces and width between said edges to afford supporting a users wrist on said top surface with a portion of the layer of gel beneath and conforming to the supported wrists and to afford significant motion of the top surface of the pad with the supported wrists relative to the bottom surface in a horizontal plane; and said pad comprising an elongate tubular layer of flexible polymeric material around the gel, said tubular layer being sealed at said ends of said pad to retain the gel within the tubular layer and to provide a flexible barrier to the escape of liquids from within the gel; and said assembly further includes an outer layer over the top surface of the pad of soft conformable material adapted for comfortable contact with a users wrists; said outer layer is in the form of a sleeve having opposite end portions extending around said support plate and said pad; and said base further includes an elongate retaining member comprising a tensioning portion within and extending along said elongate recess with a portion of said outer layer between said tensioning portion and said support plate to tension said outer layer across said top surface of said pad, means for retaining said tensioning portion within said elongate recess, and means for retaining the end portions of said sleeve around the ends of said pad.

11. A wrist rest assembly according to claim 10 wherein said retaining member has opposite ends at the ends of said elongate pad and openings into said ends, the end portions of said sleeve are positioned in said openings, and said assembly includes end caps attached at the opposite ends of said retaining member and including projections projecting into said openings in said retaining member to provide said means for retaining the end portions of said sleeve around the ends of the pad.

12. A wrist rest assembly for use along the front edge of an input device to be operated by a person's hands or fingers, said wrist rest assembly comprising:

a base having an upper surface and an opposite bottom surface adapted to be supported on a horizontal surface along the front edge of the device; and a pad comprising a layer of gel, said pad having opposite top and bottom surfaces, opposite longitudinally extending edges, and opposite longitudinally spaced ends, the bottom surface of said pad being supported on the upper surface of said base, said pad having a sufficient thickness between said top and bottom surfaces and width between said edges to afford supporting a users wrists on said top surface with a portion of the layer of gel beneath and conforming to the supported wrists and to afford significant motion of the top surface of the pad with the supported wrists relative to the bottom surface in a horizontal plane;

wherein said base comprises a top portion having said upper surface supporting the bottom surface of said pad; a bottom portion having said bottom surface adapted to be supported on a horizontal surface; and means for supporting said top portion on said bottom portion with the top surface of said pad at a predetermined one of several different distances above said bottom surface, and longitudinally extending rails projecting outwardly in opposite directions generally parallel to said upper surface, and said bottom portion includes generally parallel spaced vertically upwardly projecting support portions having opposed surfaces defining sets of grooves vertically spaced along said support portions, each of said sets of grooves being adapted to receive said rails to support said top portion with the top surface of said pad at a different distance above said bottom surface.

13. A wrist rest assembly according to claim 12 wherein said top portion and said bottom portion are both of about the same length, and said assembly further includes means for releasably retaining said top portion in engagement with said bottom portion with corresponding ends of said top and bottom portions generally in alignment.

14. A wrist rest assembly according to claim 13 wherein said means for releasably retaining said top portion in engagement with said bottom portion with the corresponding ends of said top and bottom portions generally in alignment comprises removable end covers each adapted for engagement with an end of the top portion and extending across the adjacent end of the bottom portion so that the end of the top portion with which the end cover is engaged can not move further into the bottom portion.

15. A wrist rest assembly for use along the front edge of an input device to be operated by a person's hands or fingers, said wrist rest assembly comprising:

a base having an upper surface and an opposite bottom surface adapted to be supported on a horizontal surface along the front edge of the device; and a pad comprising a layer of stable elastomeric block polymer gel, wherein said block polymer gel is polymer-oil combination comprising 5 to 30 weight percent of an A-B-A block copolymer wherein each block A is a glassy or resinous non-elastomeric thermoplastic polymer block with a glass transition temperature above room temperature, having an average molecular weight of between about 2,000 and 100,000, the end blocks A of the block copolymer constituting approximately 10–50 percent of the total polymer weight and the B block is an elastomeric polymer block of a conjugated diene, the average molecular weight between about 15,000 and about 1,000,000 and having a glass transition temperature below that of A block; and 70–95 weight percent of a stable, nonaromatic paraffinic oil of low volatility and having a boiling point in excess of the melting temperature of the said elastomeric block copolymer; and said pad having opposite top and bottom surfaces, opposite longitudinally extending edges, and opposite longitudinally spaced ends, the bottom surface of said pad being supported on the upper surface of said base, said pad having a sufficient thickness between said top and bottom surfaces and width between said edges to afford supporting a users wrists on said top surface with a portion of the layer of gel beneath and conforming to the supported wrists and to afford significant motion of the top surface of the pad with the supported wrists relative to the bottom surface of the pad in a horizontal plane.

* * * * *

UNITED STATES PATENT AND TRADEMARK OFFICE
CERTIFICATE OF CORRECTION

PATENT NO.: 5,713,544

DATED: Feb. 3, 1998

INVENTOR(S): Wolf et al.

It is certified that error appears in the above-identified patent and that said Letters Patent is hereby corrected as shown below:

In column 6, line 23, replace "portions" with -- seen in --

In column 7, line 32, replace "compressibilies" with -- compressibilities --

In column 8, line 22, "the surface" should read -- the bottom surface --

Signed and Sealed this

Second Day of February, 1999

Attest:

Attesting Officer

Acting Commissioner of Patents and Trademarks